United States Patent
Nguyen et al.

(10) Patent No.: US 10,901,400 B2
(45) Date of Patent: Jan. 26, 2021

(54) SET POINT OPTIMIZATION IN MULTI-RESOLUTION PROCESSES

(71) Applicant: International Business Machines Corporation, Armonk, NY (US)

(72) Inventors: Nam H. Nguyen, Pleasantville, NY (US); Jayant R. Kalagnanam, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 15/985,182

(22) Filed: May 21, 2018

(65) Prior Publication Data

US 2019/0354093 A1 Nov. 21, 2019

(51) Int. Cl.
*G05B 19/418* (2006.01)
*G06N 20/00* (2019.01)

(52) U.S. Cl.
CPC ... *G05B 19/41875* (2013.01); *G05B 19/4183* (2013.01); *G05B 19/41885* (2013.01); *G06N 20/00* (2019.01)

(58) Field of Classification Search
CPC ........ G06N 20/00; G06N 5/003; G06N 20/20; G05B 19/4183; G05B 19/41875; G05B 19/41885; G05B 13/041
See application file for complete search history.

(56) References Cited

U.S. PATENT DOCUMENTS

| | | | |
|---|---|---|---|
| 6,611,726 B1* | 8/2003 | Crosswhite | G06F 17/18 700/99 |
| 7,480,640 B1 | 1/2009 | Elad et al. | |
| 10,414,395 B1* | 9/2019 | Sapp | G01S 13/86 |
| 2007/0217676 A1 | 9/2007 | Grauman et al. | |
| 2008/0162269 A1 | 7/2008 | Gilbert | |
| 2009/0119501 A1* | 5/2009 | Petersen | G06F 8/65 713/100 |
| 2009/0327206 A1* | 12/2009 | MacLennan | G06N 20/00 706/59 |
| 2013/0268318 A1* | 10/2013 | Richard | G06Q 30/0202 705/7.31 |
| 2015/0302318 A1* | 10/2015 | Chen | G06N 20/00 706/12 |
| 2016/0328641 A1* | 11/2016 | Alsaud | G06N 3/04 |

(Continued)

*Primary Examiner* — M. N. Von Buhr
(74) *Attorney, Agent, or Firm* — Scully, Scott, Murphy & Presser, P.C.; Daniel P. Morris

(57) ABSTRACT

Methods and systems for determining an optimized set point for a manufacturing apparatus are described. In an example, a processor may receive observed data from the manufacturing apparatus. The observed data may include data collected by the manufacturing apparatus based on at least one resolution. The processor may generate feature data based on the observed data. The processor may determine a first model and a second model based on the feature data. The first model may relate to a first prediction of a key performance indicator of the manufacturing apparatus in a first amount of future time. The second model may relate to a second prediction of the key performance indicator of the manufacturing apparatus in a second amount of future time. The processor may determine the optimized set point based on an objective relating to the first model and based on a constraint relating to the second model.

20 Claims, 7 Drawing Sheets

(56) References Cited

U.S. PATENT DOCUMENTS

| | | | |
|---|---|---|---|
| 2017/0109646 A1* | 4/2017 | David | H01L 22/12 |
| 2017/0286860 A1* | 10/2017 | Chen | G06N 3/08 |
| 2017/0315523 A1* | 11/2017 | Cross | G05B 17/02 |
| 2018/0019910 A1* | 1/2018 | Tsagkaris | H04B 7/04 |
| 2018/0060744 A1* | 3/2018 | Achin | G06Q 10/04 |
| 2018/0113482 A1* | 4/2018 | Vitullo | G06N 20/20 |
| 2018/0150874 A1* | 5/2018 | Chen | G06Q 30/0269 |
| 2018/0247215 A1* | 8/2018 | Garvey | G08B 21/182 |
| 2018/0293515 A1* | 10/2018 | Prokopenya | G06F 16/355 |
| 2018/0300737 A1* | 10/2018 | Bledsoe | G06Q 30/0202 |
| 2018/0330300 A1* | 11/2018 | Runkana | G06Q 10/06393 |
| 2019/0138944 A1* | 5/2019 | Sinha | G06N 7/005 |
| 2019/0188581 A1* | 6/2019 | Chabin | G06N 20/00 |
| 2019/0220697 A1* | 7/2019 | Kiemele | G06T 7/75 |
| 2019/0306023 A1* | 10/2019 | Vasseur | H04L 41/147 |
| 2019/0318240 A1* | 10/2019 | Kulkarni | H04L 43/0876 |
| 2019/0342187 A1* | 11/2019 | Zavesky | H04L 43/08 |
| 2019/0349273 A1* | 11/2019 | Rikovic Tabak | G06K 9/6215 |
| 2020/0034745 A1* | 1/2020 | Nagpal | G06N 20/00 |

* cited by examiner

SET POINT OPTIMIZATION IN MULTI-RESOLUTION PROCESSES

FIELD

The present application relates generally to computers, and computer applications, and more particularly to computer-implemented methods and systems in machine learning and manufacturing processing systems.

BACKGROUND

In manufacturing physical processes (e.g., aluminum smelting process, oil production process, wind turbine energy generation process, aerospace equipment production process, and/or other processes), it is very important to keep variables operating at optimal set points to maximize efficiency and reduce possible excursions, such as setting the optimal speed for automated cars, optimal resistance for aluminum smelting processes, and other optimizations in other manufacturing processes. Conventional solutions are often based on the experience of the operators and/or engineers to manually assign the set points. In relatively simple processes, the solutions may be based on conventional physics and engineering models.

SUMMARY

In some examples, a method for determining an optimized set point for a manufacturing apparatus is generally described. The method comprising receiving, by a processor, observed data from the manufacturing apparatus. The observed data may include data collected by the manufacturing apparatus based on at least one resolution. The method may further comprise generating, by the processor, feature data based on the observed data. The method may further comprise determining, by the processor, a first model based on the feature data. The first model may relate to a first prediction of a key performance indicator of the manufacturing apparatus in a first amount of future time. The method may further comprise determining, by the processor, a second model based on the feature data. The second model may relate to a second prediction of the key performance indicator of the manufacturing apparatus in a second amount of future time. The method may further comprise determining, by the processor, the optimized set point based on an objective relating to the first model and based on a constraint relating to the second model.

In some examples, a system effective to determine an optimized set point for a manufacturing apparatus is generally described. The system comprising a memory configured to store a set of instructions indicating an objective and a constraint. The system may further comprise a processor configured to be in communication with the memory. The system may further comprise a machine learning module configured to be in communication with the processor. The system may further comprise an optimization module configured to be in communication with the processor and the machine learning module. The processor may be configured to receive observed data from the manufacturing apparatus. The observed data may include data collected by the manufacturing apparatus based on at least one resolution. The processor may be further configured to generate feature data based on the observed data. The processor may be further configured to send the feature data to the machine learning module. The machine learning module may be configured to determine a first model based on the feature data. The first model may relate to a first prediction of a key performance indicator of the manufacturing apparatus in a first amount of future time. The machine learning module may be further configured to determine a second model based on the feature data. The second model may relate to a second prediction of the key performance indicator of the manufacturing apparatus in a second amount of future time. The machine learning module may be further configured to send the first model and the second model to the optimization module. The optimization module may be configured to determine the optimized set point based on the objective and the constraint. The objective may relate to the first model and the constraint may relate to the second model.

In some examples, a computer program product for determining an optimized set point for a manufacturing apparatus is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

Figure 1:
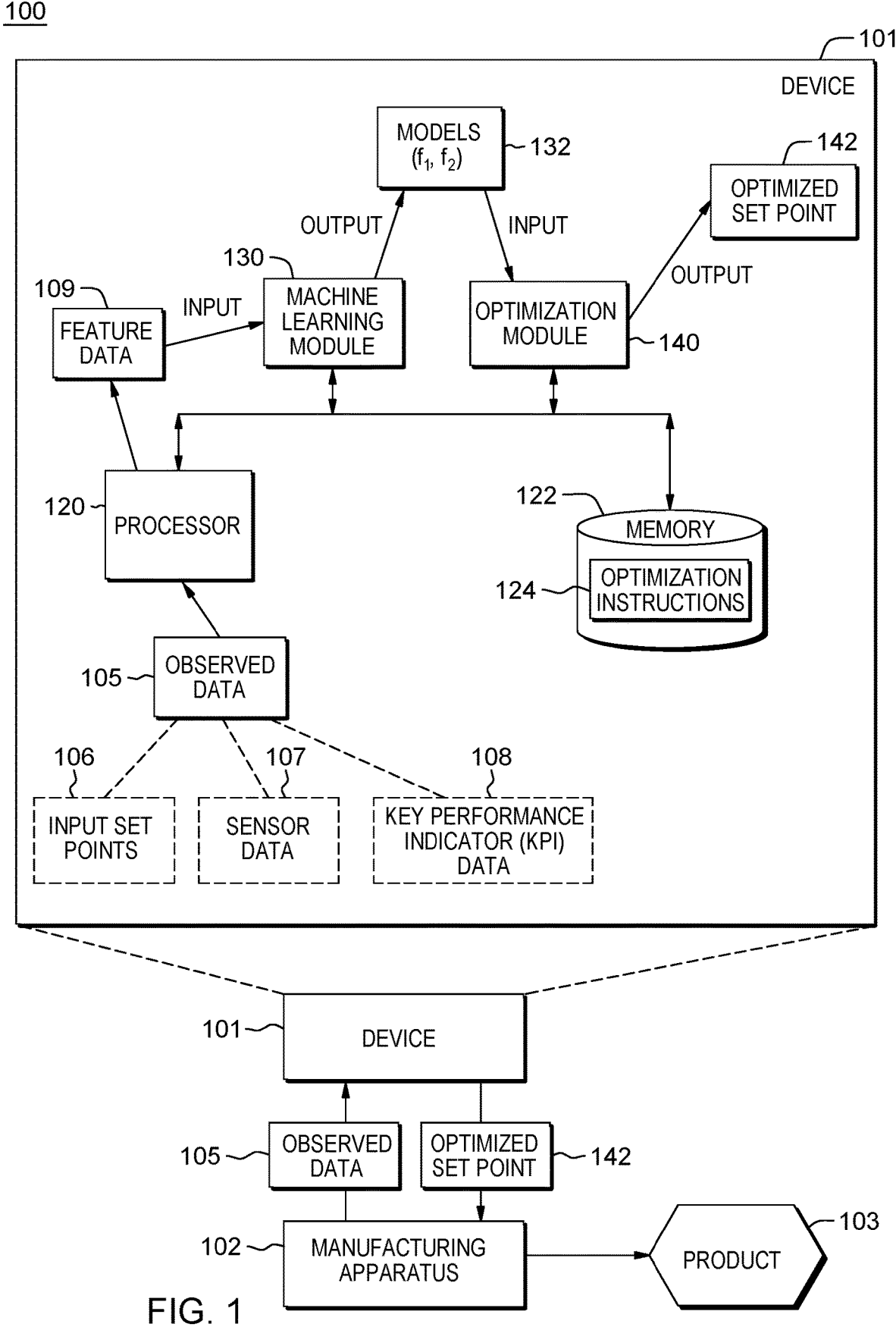
FIG. 1 illustrates an example computer system in one embodiment that can be utilized to implement set point optimization in multi-resolution processes.

In some examples, physical processes used in manufacturing have phenomena with multiple resolutions, such as temporal resolutions. Physics-based models tend to be very complex and cannot be parameterized with sensor data in near real time for operational improvement. Data-driven machine learning models provide feasible computational alternative to assimilate sensor data into predictive and prescriptive models. But the challenges are to handle multiple different resolutions (e.g., temporal resolutions) that are relevant for the desired key performance indicators (KPI), such as yield and efficiency. In order to address the challenge of handling multiple different resolutions, it is necessary to exploit multi-resolution sensor data collected from the manufacturing processes in order to reveal important information, such that optimal control set points may be established. Therefore, a system is needed to fuse information collected at different resolutions in order to provide better prediction in manufacturing systems.

For example, in an aluminum smelting processing environment involving electrolyzed chemical interactions in a pot room, multiple different resolutions of data may be collected by various sensors. Some example data collection may include capturing extremely fast changes in the pot room, such as noise, every ten seconds; capturing data from relatively faster processes every five minutes; or capturing relatively slow processes, such as temperature change, on a daily basis. Since different types of data are being collected at different time intervals (temporal resolutions), there is a need to fuse the collected data to accurately assess a performance of the processing system.

A system in accordance with the present disclosure (e.g., system 100 shown in FIG. 1) may facilitate building a predictive machine learning model using observed variables (e.g., data collected from a manufacturing process or system) to exploit important information from multi-resolution sensor data, learn the behaviors of manufacturing physical processes at different set points, establish the optimal set points to improve near future yield and efficiency while keeping the processes stable in the far future, and provide a path for moving poorly performing processes to new set points that improve performance.

To be further described below, the system 100 may provide advisory control set points to improve yield and efficiency for multi-resolution processes. For example, the system 100 may build machine learning predictive model(s) for multi-resolution process data by creating desired features from finer resolution, learning the model(s) based on the created features, and building an optimization framework for seeking the best control set points. The system 100 may also dynamically change the set points based on the condition of the processes at certain time periods, and continuously adjust the set points when new data is available.

Also described in more detail below, the system 100 may use available data, or observed data, to build machine learning predictive model(s) in order to predict a near efficiency function and a far future efficiency function, where the predicted functions are functions of observed variables and the set point variables. In an example, if the observed variables are independent from the set point variables, the system 100 may search for a best value of the set point variables to maximize the near efficiency while the far future efficiency does not significantly degrade. The search may be obtained by solving an optimization problem relating to a maximization of the near efficiency function subject to a constraint relating to the far future efficiency function, where the constraint is based on a parameter to control a degradability of the far future efficiency function. In an example, the solution to the optimization problem may be based on a search over all possible choices of the set point variables when a space of the set point variables is finite and small. The system 100 may, based on the solution to the optimization problem, establish a new set point that may attain the best predicted efficiency outcomes of the near efficiency function and the far future efficiency function.

In another example, a challenge that may be addressed by the system 100 may be dependencies of the observed variables on the set point variables, since changes in the set point variables may lead to changes in the dependent observed variables as well. In examples where the observed variables include both dependent and independent observed variables, the system 100 may build regression models relating to the dependent observed variables. The system 100 may then perform the search for a best value of the set point variables in order to optimize the near efficiency function based on both the dependent and independent observed variables, subject to a constraint relating to the far future efficiency function.

FIG. 1 illustrates an example computer system 100 that can be utilized to implement set point optimization in multi-resolution processes, arranged in accordance with at least some embodiments described herein. In some examples, the system 100 may be implemented by a device 101 to facilitate a determination of an optimized set point 142 to be inputted into a manufacturing apparatus 102, where the manufacturing apparatus 102 may be operable to output a product 103, and may include a computer system configured to monitor operations of the manufacturing apparatus 102. For example, manufacturing apparatus 102 may produce oil, energy, aerospace equipments, processed aluminum, and/or other products. In some examples, the device 101 may be a computing device such as a desktop computer, a laptop computer, a server, and/or a device that may include a plurality of processing elements. The device 101 may be configured to be in communication with the manufacturing apparatus 102 directly, such as, via a wire and/or cable, or wirelessly (e.g., BLUETOOTH, near-field communication, Internet, WI-FI, cellular network, and/or other wireless communication protocol). In some examples, device 101 may be a part of manufacturing apparatus 102, such as a computing device of the manufacturing apparatus 102.

In an example embodiment, the device 101 may include a processor 120, a memory 122, a machine learning module 130, and/or an optimization module 140, that may be configured to be in communication with each other. The processor 120 may be a central processing unit of the device 101. In some examples, the processor 120 may be configured to control operations of the machine learning module 130 and the optimization module 140. In some examples, the machine learning module 130 and the optimization module 140 may be hardware components such as programmable logic devices, microcontrollers, memory devices, and/or other hardware components, of the processor 120 and/or the device 110. In some examples, the machine learning module 130 and the optimization module 140 may be software modules that may be implemented with the processor 120 to perform one or more tasks. In some examples, the machine learning module 130 and the optimization module 140 may be packaged as an application that may be controlled and/or executed by the processor 120 of the device 101 in order to implement the system 100.

The memory 122 may be configured to selectively store instructions executable by the processor 120, the machine learning module 130, and the optimization module 140. For example, in one embodiment, the memory 122 may store a set of optimization instructions 124, where the optimization instructions 124 may include instructions, such as executable code, related to machine learning algorithms. The optimization instructions 124 may also indicate objectives and constraints relating to at least one key performance indicator of the manufacturing apparatus 102. The processor 120, the machine learning module 130, and the optimization module 140 may each be configured to execute one or more portions of the optimization instructions 124 in order to facilitate implementation of the system 100.

In an example embodiment, the manufacturing apparatus 102 may provide observed data 105 to the device 101, in order for device 101 to determine the optimized set point 142 for the manufacturing apparatus 102. The observed data 105 may include input set points 106, sensor data 107, key performance indicator (KPI) data 108, and/or other data related to production of product 103. The input set points 106 may include set points that have been inputted into the manufacturing apparatus 102 at one or more past time instances, or that may have been used by the manufacturing apparatus. Examples of a set point may include an amount of raw materials inputted into manufacturing apparatus, a temperature relating to the production process of the product 103 that may have been set by an operator of the manufacturing apparatus 102, a speed to operate mechanisms of a manufacturing apparatus 102, and/or other parameters that may be set, controlled, adjusted, or changed, by an operator of the manufacturing apparatus 102. The sensor data 107 may include data collected from one or more homogeneous and/or heterogeneous sensors, such as data relating to temperature, pressure, humidity, and/or other sensor data relating to the production of the product 103. The sensor data 107 may include multi-resolution data, such as data collected from the sensors of manufacturing apparatus 102 at different time intervals. The key performance indicator data 108 may include data relating to one or more key performance indicators relating to production of the product 103 performed by the manufacturing apparatus 102, such as efficiency, throughput, energy consumption, yield, manufacturing cycle time, and/or other key performance indicators.

The device 101, or the processor 120, may receive the observed data 105 and may store the received observed data 105 in memory 122. Processor 120 may be configured to generate, or derive, feature data 109 based on the sensor data 107, such as by transforming the sensor data 107 into a format that may be used by machine learning module 130, extracting noise data from the sensor data 107, combining multi-resolution data among the sensor data 107, identifying a particular statistic (e.g., average, median, and/or other statistics) of the sensor data 107, and/or performing other transformations (further described below). The processor 120 may send the feature data 109, the input set points 106, and the key performance indicator data 108 to the machine learning module 130.

The machine learning module 130 may learn, or determine, one or more models 132 based on the feature data 109, the input set points 106, and the key performance indicator data 108. In some examples, the sensor data 107 may be in a format suitable for machine learning module, or may include data of an appropriate resolution, such that learning of the models 132 may be further based on the sensor data 107. The machine learning module 130 may apply machine learning algorithms among optimization instructions 124 on the feature data 109, the input set points 106, and the key performance indicator data 108 to learn one or more models 132. As will be further described below, the machine learning module 130 may learn a first model (denoted as $f_1$) and a second model (denoted as $f_2$), where the first model $f_1$ may relate to a near future KPI and the second model $f_2$ may relate to a far future KPI (further described below). The machine learning module 130 may send the learned models 132 to the optimization module 140. In some examples, and further described below, the machine learning module 130 may be configured to learn regression models representing the observed variables (e.g., the sensor data 107) that may be dependent on the observed set points (e.g., input set points 106).

The optimization module 140 may apply the optimization instructions 124 on the models 132, which includes models $f_1$ and $f_2$, to determine the optimized set point 142. The optimization instructions 124 may indicate one or more conditions and constraints for the optimization module 140 to optimize models 132 and to determine the optimized set point 142. For example, the optimization instructions 124 may indicate that in order to optimize a model relating to throughput, the optimization module 140 may need to optimize the model by maximizing an output of the model subject to a constraint relating to throughput. In another example, the optimization instructions 124 may indicate that in order to optimize a model relating to energy consumption, the optimization module 140 may need to optimize the model by minimizing an output of the model subject to a constraint relating to energy consumption. By optimizing models 132 according to the optimization instructions 124, optimization module 140 may determine the optimized set points 142 that may optimize a manufacturing process to produce product 103.

Device 101 may provide the optimized set point 142 to the manufacturing apparatus 102, and may set, or define, the optimized set point 142 as an input to the manufacturing apparatus 102, such that subsequent instances of production of product 103 may be based on the optimized set point 142. Manufacturing apparatus 102 may continue to provide updated observed data 105, including one or more of updated values of the input set points 106, the sensor data 107, and the KPI data 108, in order for device 101 to update the optimized set point 142 for the manufacturing apparatus 102.

Figure 2:
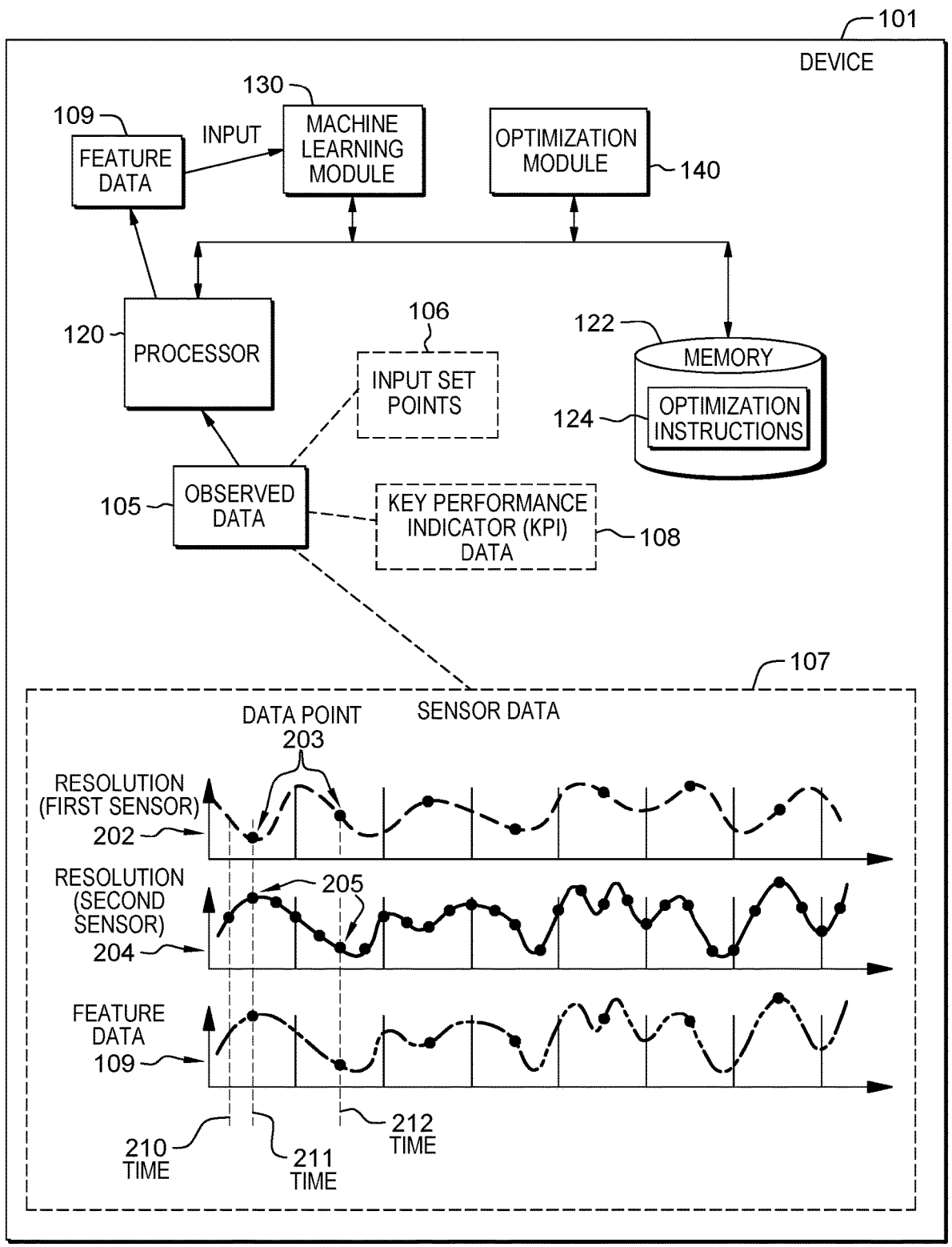
FIG. 2 illustrates the example system of FIG. 1 with additional details relating to set point optimization in multi-resolution processes in one embodiment of the present disclosure.

FIG. 2 illustrates the example system of FIG. 1 with additional details relating to set point optimization in multi-resolution processes, arranged in accordance with at least some embodiments described herein. FIG. 2 is substantially similar to computer system 100 of FIG. 1, with additional details. Those components in FIG. 2 that are labeled identically to components of FIG. 1 function as described with reference to FIG. 1.

As mentioned above, the processor 120 may be configured to generate the feature data 109 based on the sensor data 107 collected from different sensors and at different time intervals. In an example shown in FIG. 2, a first sensor may collect sensor data including one or more data points 203 at a first time interval represented as a resolution 202, and a second sensor may collect sensor data including one or more data points 205 at a second time interval represented as a resolution 204. The first sensor and the second sensor may be homogeneous or heterogeneous sensors. The processor 120 may analyze the data points 203 collected at the resolution 202 and the data points 205 collected at the resolution 204 according to optimization instructions 124. Although two resolutions are shown in the example presented in FIG. 2, in some examples, data collected at more than two resolutions may also be analyzed by system 100.

In an example, the optimization instructions 124 may indicate an embodiment to extract data points from a higher resolution among the resolution 202 and the resolution 204. The processor 120 may search for, or identify, one or more time instances where data were collected by the first and second sensors at the resolution 202 and the resolution 204, respectively, and extract the data point from the higher resolution (e.g., resolution 204) at the identified time instances. For example, the processor 120 may determine that the resolution 202 is the lower resolution and, in response, may extract data points 205 collected at resolution 204 at the time intervals where data are also collected at the resolution 202. In the example shown in FIG. 2, the processor 120 may not extract any data points at time 210 due to the fact that no data point was collected at resolution 202 by the first sensor. At time 211, the processor 120 may extract data point 205 since data were collected at both the resolution 202 and the resolution 204 at time 211. Similarly, the processor 120 may extract data point 205 since data were collected at both the resolution 202 and the resolution 204 at time 212. The processor 120 may continue to extract data points 205 from resolution 204 and upon a completion of the extraction, the processor 120 may compile the extracted data points 205 to derive, or generate, feature data 109.

In another example, the optimization instructions 124 may indicate another embodiment to derive the feature data 109 by determining an average between data points from both the resolution 202 and the resolution 204. The processor 120 may search for, or identify, one or more time instances where data were collected by the first and second sensors at the resolution 202 and the resolution 204, respectively, and determine an average value between the data points from the resolution 202 and the resolution 204 at the identified time instances.

The optimization instructions 124 may indicate further embodiments to derive feature data 109, such as identifying a median among data points from different resolutions, applying window shifting techniques on data points from particular resolutions, and/or other analysis techniques, depending on a desired implementation of system 100.

The processor 120 may derive more than one set of feature data 109. For example, the processor 120 may derive a set of feature data representative of temperature, a set of feature data representative of pressure, and/or feature data for other attributes relating to production of product 103.

Figure 3:
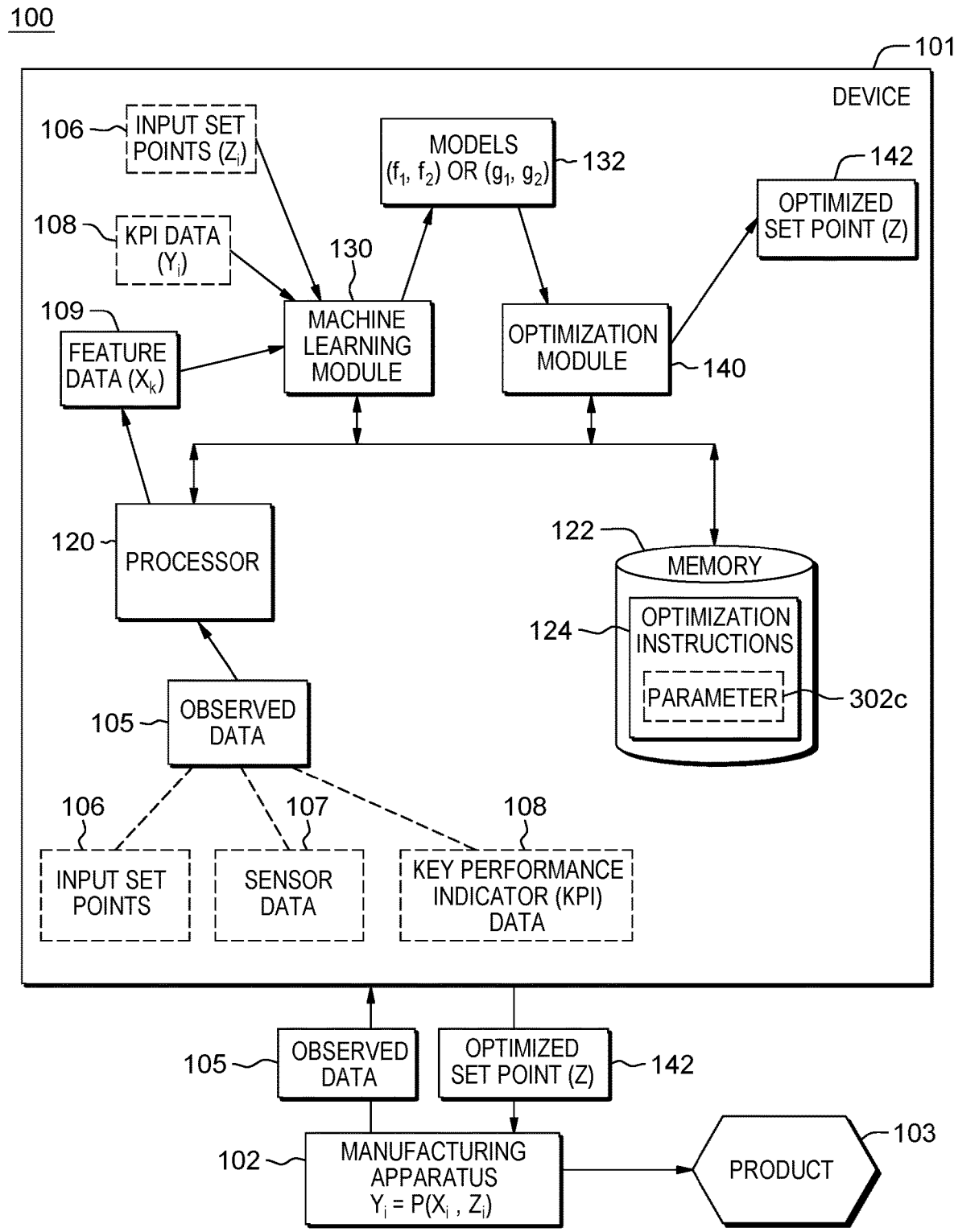
FIG. 3 illustrates the example system of FIG. 1 with additional details relating to set point optimization in multi-resolution processes in one embodiment of the present disclosure.

FIG. 3 illustrates the example system of FIG. 1 with additional details relating to set point optimization in multi-resolution processes, arranged in accordance with at least some embodiments described herein. FIG. 3 is substantially similar to computer system 100 of FIG. 1, with additional details. Those components in FIG. 3 that are labeled identically to components of FIG. 1 function as described with reference to FIG. 1.

The machine learning module 130 may receive the feature data 109 (denoted as $X_i$), the input set points 106 (denoted as $Z_i$), and the KPI data 108 (denoted as $Y_i$) from the processor 120. In an example, each $Y_i$ may be an output of a function associated with a process P used by the manufacturing apparatus 102 to produce product 103, where the function may be dependent on corresponding $X_i$ and $Z_i$ (e.g., $Y_i = P(X_i, Z_i)$). In examples where the sensor data 107 do not require transformation into the feature data 109, $X_i$ may also denote the sensor data 107. The machine learning module 130 may apply machine learning algorithms on the received data to learn models 132. In an example, the machine learning module 130 may identify the input set points 106 as training inputs, the KPI data 108 as training labels, and the feature data 109 as weights or dimensions of the input set points, depending on a dependency of the feature data 109 on input set points 106. For example, when the feature data 109 is independent from input set points 106 (e.g., changing a value of $Z_i$ would not change a value of $X_i$), the feature data 109 may be weights that may be applied on the input set points 106 to change a value of the KPI data 108. When the feature data 109 is dependent on input set points 106 (e.g., changing a value of $Z_i$ would change a value of $X_i$), the feature data 109 may be a dimension of the input set points 106, such as a variable among a function representative of the input set points 106.

The machine learning module 130 may learn a first model $f_1$, which may be a model representative of a near future KPI prediction denoted as $Y_{near}$. A near future KPI prediction include a predicted efficiency of the manufacturing apparatus 102, a predicted energy consumption of the manufacturing apparatus 102, a predicted throughput of the manufacturing apparatus 102, in a near future such as a next hour, a next day, a next two days, and/or other amount of time.

The machine learning module 130 may learn a second model $f_2$, which may be a model representative of a far future KPI prediction denoted as $Y_{far}$. A far future KPI prediction include a predicted efficiency of the manufacturing apparatus 102, a predicted energy consumption of the manufacturing apparatus 102, a predicted throughput of the manufacturing apparatus 102, in a far future such as a next month, a next year, and/or other amount of time.

When the feature data 109 is independent from the set point variable Z, the near future KPI prediction $Y_{near}$ and the far future KPI prediction $Y_{far}$ may be denoted as:

$$Y_{near} = f_1(X_1, X_2, \ldots, X_d, Z)$$

$$Y_{far} = f_2(X_1, X_2, \ldots, X_d, Z)$$

where $X_1, X_2, \ldots, X_d$ are independent groups of observed variables (e.g., each group corresponds to an attribute, such as a group for temperature, a group for pressure, etc.) that were used by the machine learning module 130 to learn models 132 (or formation of $Y_{near}$ and $Y_{far}$), and Z denotes the set point variable that needs to be optimized by the optimization module 140. In an example embodiment, an optimization of the variable Z is an identification of an optimal value of Z based on one or more constraints, which will be further described below. In some examples, the models $f_1$ and $f_2$ may model a manufacturing process that can be executed by the manufacturing apparatus 102, where the manufacturing process may be of a high complexity. As such, the system 100 may provide a solution to address a challenge of analyzing performances of highly complex manufacturing processes by using machine learning techniques to train, or estimate, models that may be used to analyze various KPIs of the manufacturing processes.

When at least a portion of the feature data 109 is dependent from the set point variable Z, the dependent portion of the feature data 109 may be denoted as $X_1, X_2, \ldots, X_a$ and the independent portion of the feature data 109 may be denoted as $X_{a+1}, \ldots, X_d$. The machine learning module 130 may learn one or more regression models $g_1, g_2, \ldots, g_a$, based on relationship between the dependent feature data $X_i$ (i=1, . . . , a) with the set point variable Z, and based on independent variables $X_{a+1}, \ldots, X_d$.

The dependent portion of the feature data 109, $X_1, X_2, \ldots, X_a$, may be represented by the regressions models $g_1, g_2$ as follows:

$$X_1 = g_1(X_a, X_{a+1}, \ldots, X_d, Z)$$

$$X_2 = g_2(X_a, X_{a+1}, \ldots, X_d, Z)$$

$$X_a = g_a(X_a, X_{a+1}, \ldots, X_d, Z)$$

The amount of time that constitutes a near future and a far future may be dependent on a desired implementation of system 100, or may be arbitrarily defined by a user of system 100, or by an operator of manufacturing apparatus 102, etc.

The amount of time in the near future time and the far future time may begin at a current time. The near future time and the far future time may include overlapping time instances, or non-overlapping time instances. In an example, an operator of the manufacturing apparatus 102 who may be looking to solve an efficiency problem in production of product 103 with the next week may consider one day as a near future amount of time, and one week as a far future amount of time. An operator of the manufacturing apparatus 102 who may be looking to solve an efficiency problem in production of product 103 with the next year may consider one month as a near future amount of time, and one year as a far future amount of time.

In some examples, the amount of training data used by machine learning module 130 to learn models 132 may be based on the defined amount of time for the near future and the far future. If the near future is defined as one week, the machine learning module 130 may learn model $f_1$ based on approximately one week of data among the feature data 109, the input set points 106, and the KPI data 108. If the far future is defined as one year, the machine learning module 130 may learn model $f_2$ based on approximately one year of data among the feature data 109, the input set points 106, and the KPI data 108.

Upon learning models 132, the machine learning module 130 may send the learned models 132 to the optimization module 140.

The optimization module 140 may apply objectives and constraints indicated by optimization instruction 124 on models 132, in order to determine the optimized set point 142, which may be an optimal value of the set point variable Z.

In an example, system 100 may be implemented to determine the optimized set point 142 that may lead to an optimal efficiency of the manufacturing apparatus 102. The optimization instruction 124 may indicate that in order to identify the optimized set point 142 for optimal efficiency, the model $f_1$ needs to be maximized subject to a constraint that the model $f_2$ needs to be greater than a parameter 302 (denoted as c), where parameter 302 may be a predefined value that controls a degradability of the KPI prediction $Y_{far}$.

In examples where the observed variables X (e.g., feature data 109) are independent from the set point variable X, the objective and constraint to determine an optimal set point for optimal efficiency may be denoted as:

$$\max f_1(X_1, X_2, \ldots, X_d, Z) \text{ subject to: } f_2(X_1, X_2, \ldots, X_d, Z) > c$$

The optimization module 140 may search for a best value of Z that maximizes model $f_1$ and yet, constrain the model $f_2$ to be greater than parameter c. In an example embodiment, the optimization module 140 may search all possible choices of Z when a space of Z is finite and small. Upon a completion of the search, the optimization module 140 may identify a value of the set point variable Z that attains the optimal predicted efficiencies $Y_{near}$ and $Y_{far}$.

In examples where the observed variables X (e.g., feature data 109) include dependent and/or independent variables from the set point variable X, the objective and constraint to determine an optimal set point for optimal efficiency may be denoted as:

$$\max f_1(g_1, \ldots, g_a, X_{a+1}, \ldots, X_d, Z) \text{ subject to: } f_2(g_1, \ldots, g_a, X_{a+1}, \ldots, X_d, Z) > c$$

In some examples, a value of the parameter 302 may be set by an operator of the manufacturing apparatus 102. In some examples, the optimal predicted efficiencies $Y_{near}$ and $Y_{far}$ may change over time when the models $f_1$ and $f_2$ are regression models. The system 100 may retrain the models $f_1$ and $f_2$ to over time in order to adapt to the dynamics of the manufacturing process being executed by the manufacturing apparatus 102.

In another example, system 100 may be implemented to determine the optimized set point 142 that may lead to an optimal energy consumption by the manufacturing apparatus 102. The optimization instructions 124 may indicate that in order to identify the optimized set point 142 for optimal energy consumption, the model $f_1$ needs to be minimized subject to a constraint that the model $f_2$ needs to be less than the parameter 302. In other examples, the objectives and constraints to determine the optimized set point 142 may be based on the KPI that needs to be optimized.

Figure 4:
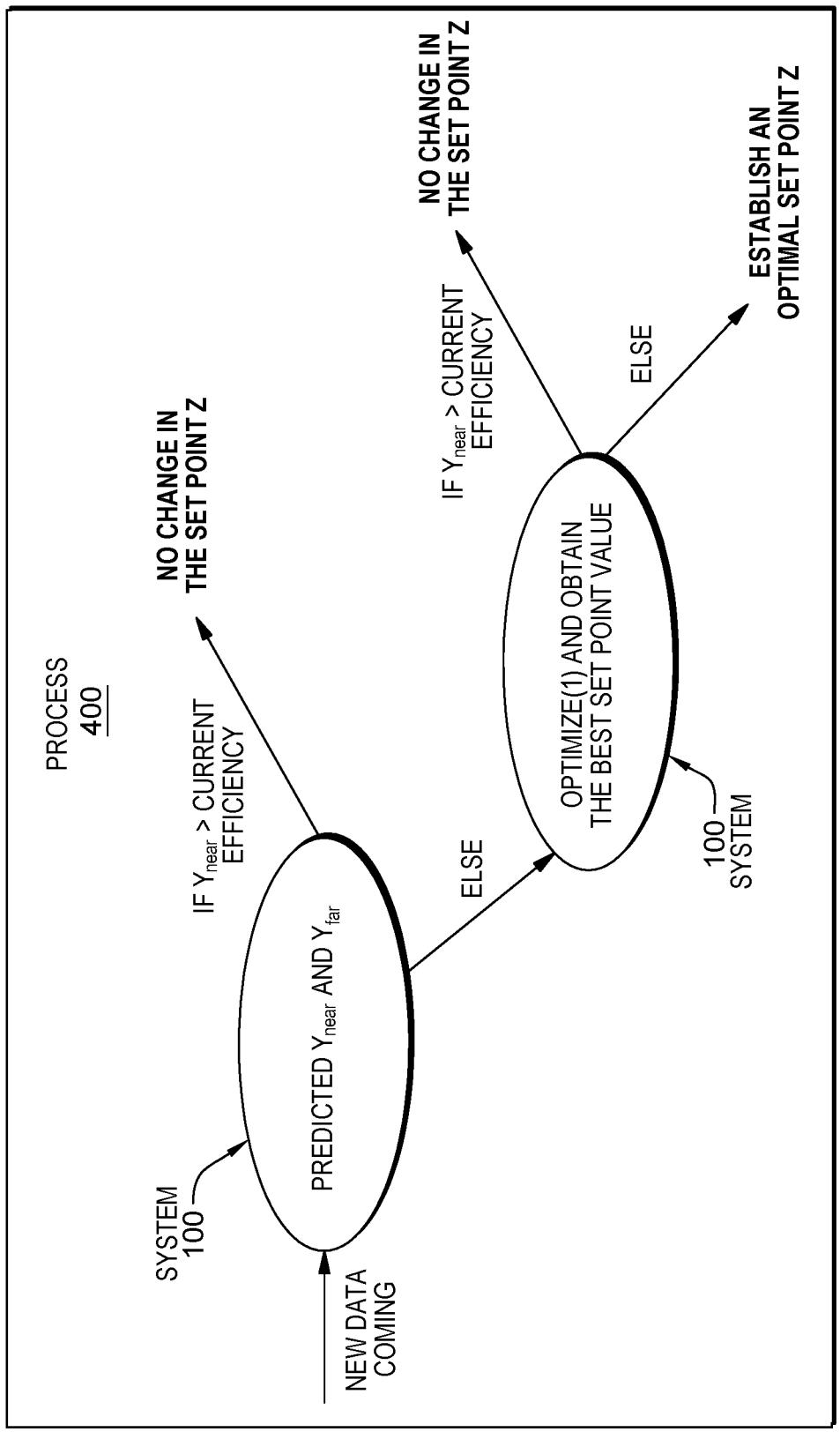
FIG. 4 illustrates an example process from an implementation of the example system of FIG. 1 relating to set point optimization in multi-resolution processes in one embodiment of the present disclosure.

FIG. 4 illustrates an example process from an implementation of the example system of FIG. 1 relating to set point optimization in multi-resolution processes, arranged in accordance with at least some embodiments described herein. At least some of the components in FIG. 4 may be described below with reference to components from FIG. 1.

An example process 400 shown in FIG. 4 relates to an embodiment where system 100 continues to receive new data from the manufacturing apparatus 102 in order to update the optimized set point 142, such that an efficiency of the manufacturing apparatus may be maintained at a desirable level. In the example process 400, new data, such as new observed data, may be input into system 100. The new observed data may include updated values of the observed data 105, and/or may include updated values of the input set points 106, the sensor data 107, and/or the KPI data 108. The system 100 may determine new models based on the newly received data in order to update efficiency predictions $Y_{near}$ and $Y_{far}$.

The system 100 may compare the updated efficiency prediction $Y_{near}$ with a current efficiency of the manufacturing apparatus 102. If the updated efficiency prediction $Y_{near}$ is greater than the current efficiency, then the system 100 may determine that set point Z does not need to be changed since the predicted efficiency is greater than, or an improvement over, the current efficiency. When no change is needed for set point Z, the system 100 may continue to wait for a next set of new data from the manufacturing apparatus 102.

If the updated efficiency prediction $Y_{near}$ is less then than the current efficiency, then the system 100 may determine that set point Z needs to be changed since the predicted efficiency is less than, or fails to improve over, the current efficiency. The system 100 may execute the objectives and constraints relating to efficiency, which may be indicated by the optimization instruction 124 stored in memory 122, to determine a new optimized set point 142 (optimal set point Z).

The system 100 may continue to receive new observed data, and for each set of received observed data, perform comparisons between predicted near future KPI with a current KPI to determine if changes are needed to the set point Z. As such, a performance of the manufacturing apparatus 102 may be maintained as manufacturing apparatus 102 is being run to produce product 103. Further, the system 100 may automatically update the updated set points at the manufacturing apparatus 102 such that an operator of the manufacturing apparatus 102 may not need to manually define a new set point in response to new sets of observe data at future instances.

Figure 5:
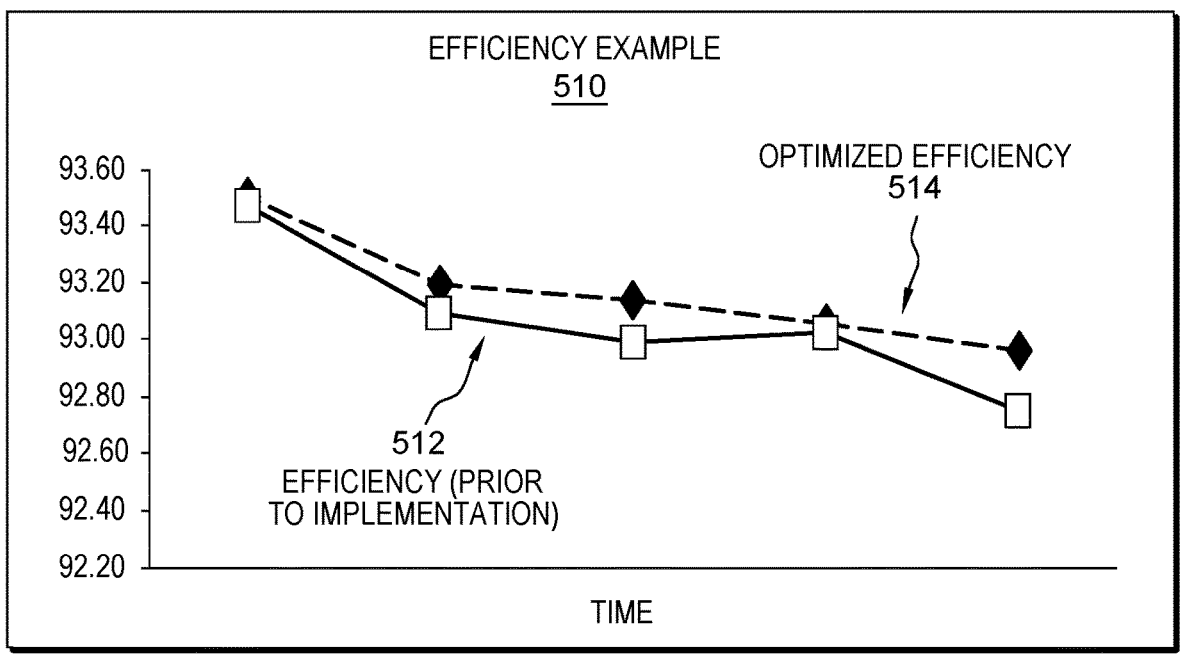
FIG. 5 illustrates an example result from an implementation of the example system of FIG. 1 relating to set point optimization in multi-resolution processes in one embodiment of the present disclosure.

FIG. 5 illustrates an example process from an implementation of the example system of FIG. 1 relating to set point optimization in multi-resolution processes, arranged in accordance with at least some embodiments described herein. At least some of the components in FIG. 5 may be described below with reference to components from FIG. 1.

As shown in a plot, or graph, of efficiency vs. time in FIG. 5 (labeled as efficiency example 510), an efficiency 512 of the manufacturing apparatus 102, prior to an implementation of the system 100, may be improved to an optimized efficiency 514 upon the implementation of the system 100, where the optimized efficiency 514 is greater than the efficiency 512 at one or more time instances.

Figure 6:
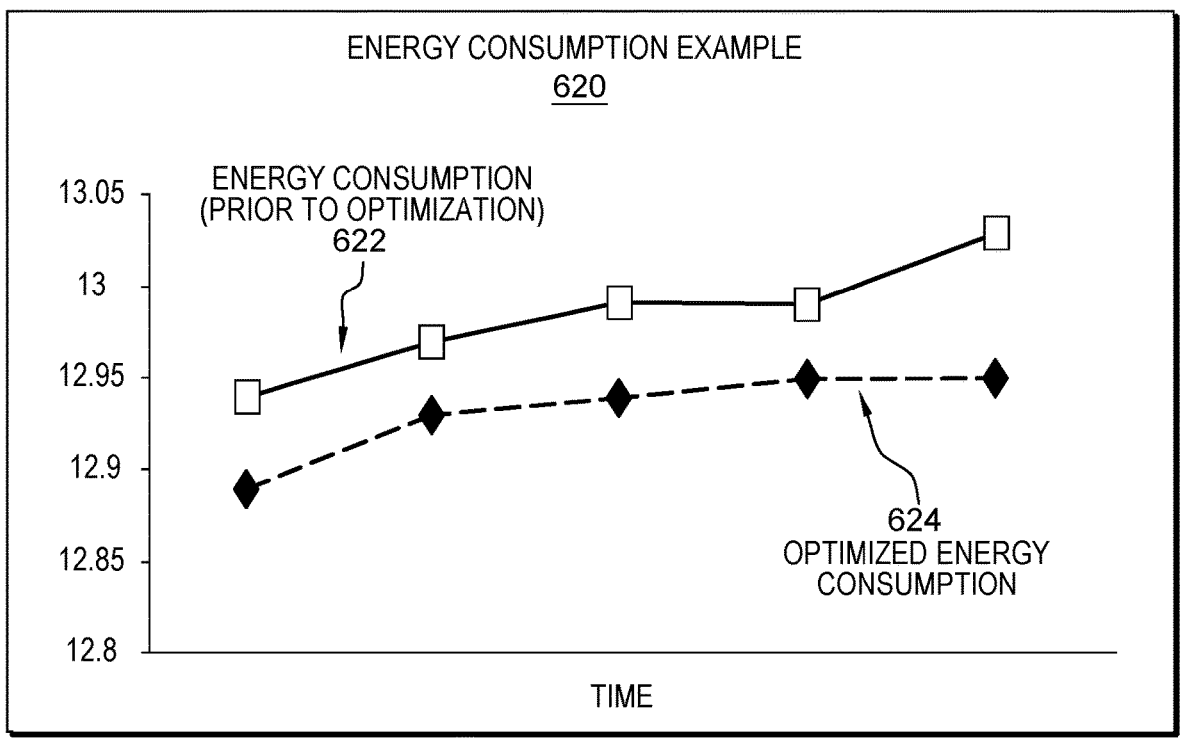
FIG. 6 illustrates an example result from an implementation of the example system of FIG. 1 relating to set point optimization in multi-resolution processes in one embodiment of the present disclosure.

FIG. 6 illustrates an example process from an implementation of the example system of FIG. 1 relating to set point optimization in multi-resolution processes, arranged in accordance with at least some embodiments described herein. At least some of the components in FIG. 6 may be described below with reference to components from FIG. 1.

As shown in a plot, or graph, of energy consumption vs. time in FIG. 6 (labeled as energy consumption example 620), an energy consumption 622 of the manufacturing apparatus 102, prior to an implementation of the system 100, may be improved to an optimized energy consumption 624 upon the implementation of the system 100, where the optimized energy consumption 624 is less than the efficiency 622 at one or more time instances.

Figure 7:
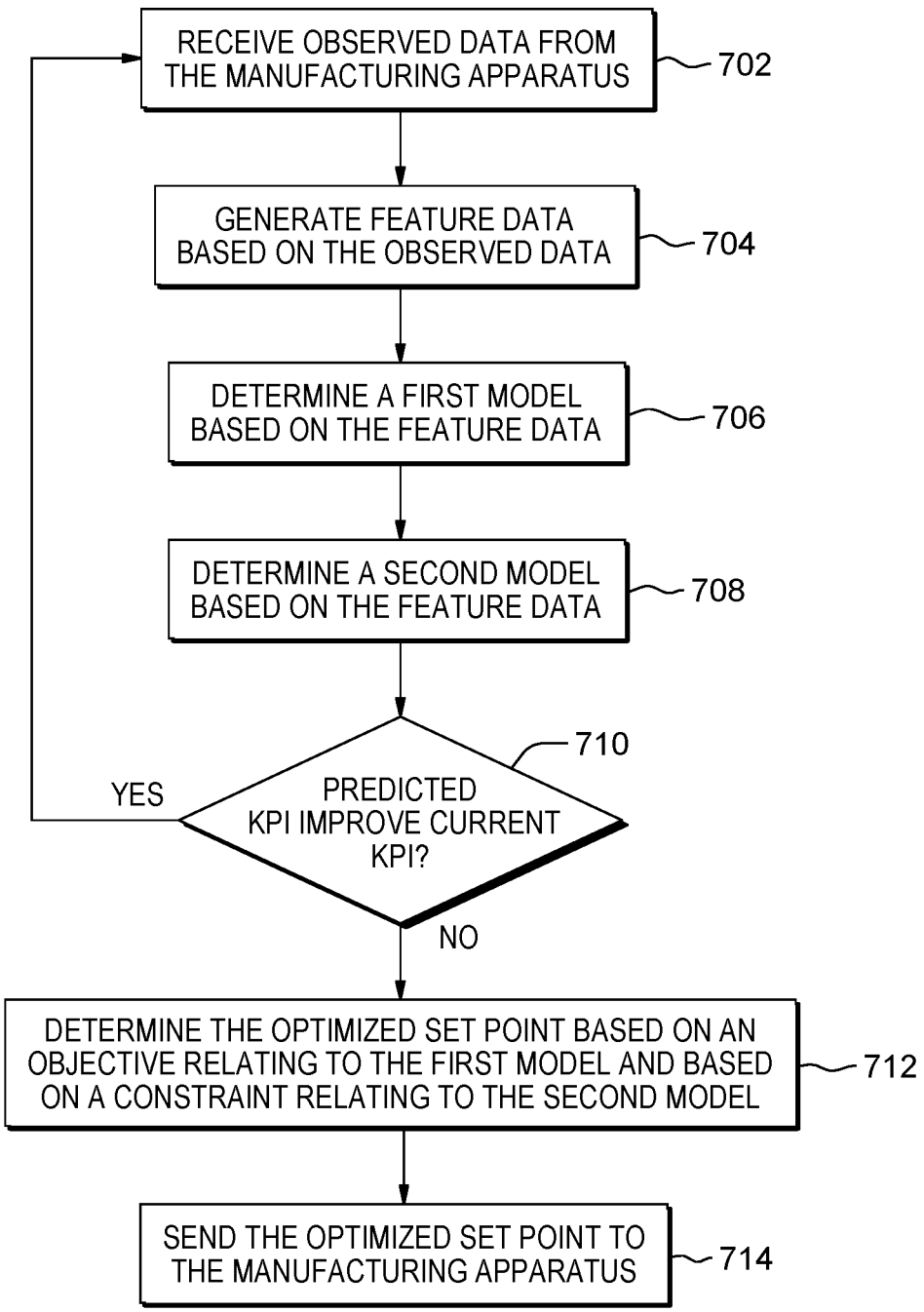
FIG. 7 illustrates a flow diagram relating to set point optimization in multi-resolution processes in one embodiment of the present disclosure.

FIG. 7 illustrates a flow diagram relating to set point optimization in multi-resolution processes, arranged in accordance with at least some embodiments presented herein. The process in FIG. 7 may be implemented using, for example, computer system 100 discussed above. An example process may include one or more operations, actions, or functions as illustrated by one or more of blocks 702, 704, 706, 708, 710, 712, and/or 714. Although illustrated as discrete blocks, various blocks may be divided into additional blocks, combined into fewer blocks, eliminated, or performed in parallel, depending on the desired implementation.

Processing may begin at block 702, where a processor may receive observed data from a manufacturing apparatus. The observed data may include sensor data collected by the manufacturing apparatus based on at least one time resolution.

Processing may continue from block 702 to block 704. At block 704, the processor may generate feature data based on the observed data.

Processing may continue from block 704 to block 706. At block 706, the processor may determine a first model based on the feature data. The first model may relate to a first prediction of a key performance indicator of the manufacturing apparatus in a first amount of future time (e.g., the near future time described above).

Processing may continue from block 706 to block 708. At block 708, the processor may determine a second model based on the feature data. The second model may relate to a second prediction of the key performance indicator of the manufacturing apparatus in a second amount of future time. The second amount of future time may be greater than the first amount of future time (e.g., the far future time described above).

Processing may continue from block 708 to block 710. At block 710, the processor may compare the first prediction of the key performance indicator with a current key performance indicator of the manufacturing apparatus. If the predicted KPI is an improvement over the current KPI, the process may return to block 702, where the process may wait for a next receipt of new observed data from the manufacturing apparatus. If the predicted KPI is not an improvement over the current KPI, the process may continue to block 712.

Processing may continue from block 710 to block 712. At block 712, the processor may determine the optimized set point based on an objective relating to the first model and based on a constraint relating to the second model.

Processing may continue from block 712 to block 714. At block 714, the processor may send the optimized set point to the manufacturing apparatus.

Figure 8:
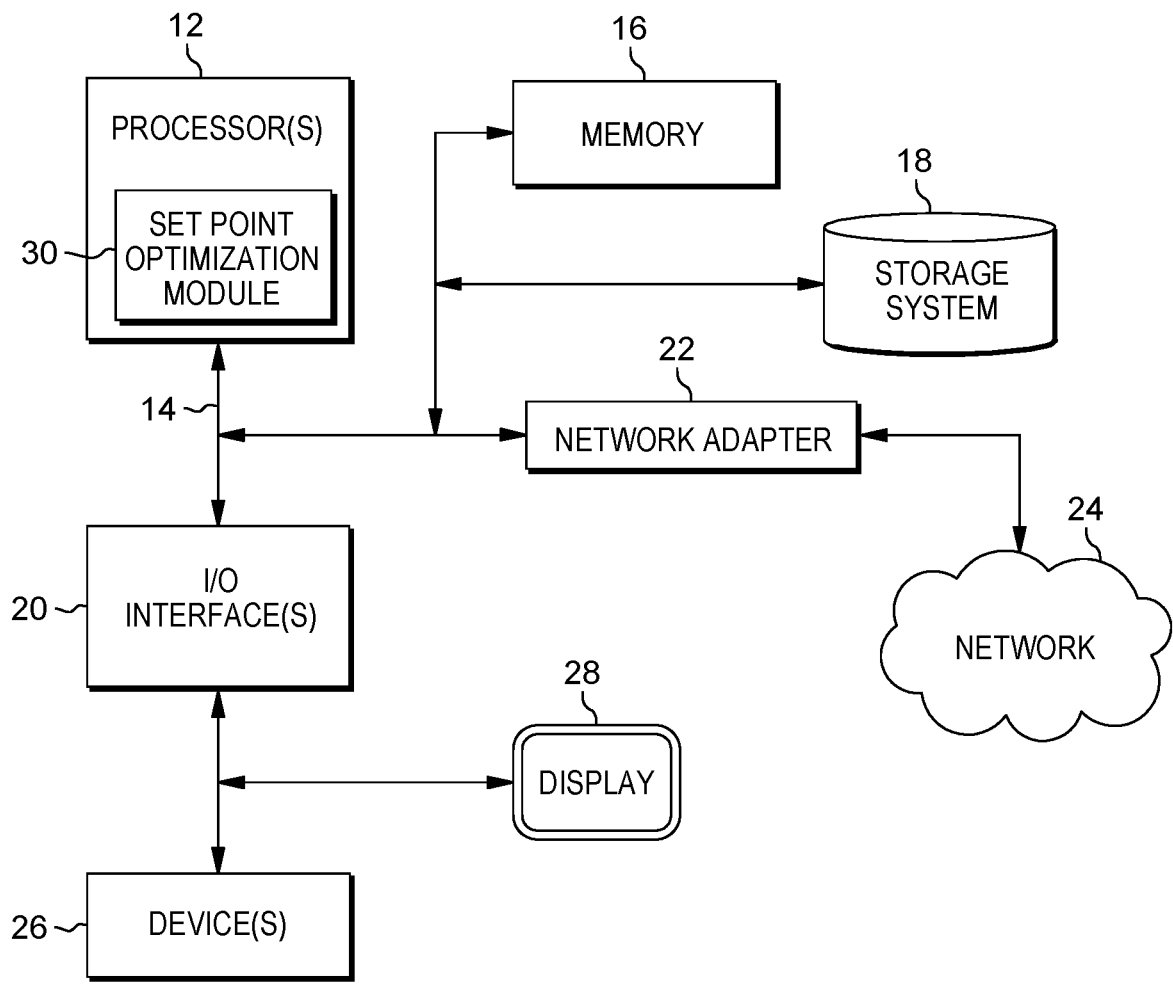
FIG. 8 illustrates a schematic of an example computer or processing system that may implement set point optimization in multi-resolution processes in one embodiment of the present disclosure.

FIG. 8 illustrates a schematic of an example computer or processing system that may implement set point optimization in multi-resolution processes in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., set point optimization module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining an optimized set point for a manufacturing apparatus, the method comprising:
   receiving, by a processor, observed data from the manufacturing apparatus, wherein the observed data includes data collected by the manufacturing apparatus based on at least one resolution;
   generating, by the processor, feature data based on the observed data;
   determining, by the processor, a first model using a portion of the feature data corresponding to a first amount of future time ranging from a start time to a first end time, wherein the first model relates to a first prediction of a key performance indicator of the manufacturing apparatus in the first amount of future time;
   determining, by the processor, a second model using another portion of the feature data corresponding to a second amount of future time ranging from the start time to a second end time different from the first end time, wherein the second model relates to a second prediction of the key performance indicator of the manufacturing apparatus in the second amount of future time; and
   determining, by the processor, the optimized set point based on:
      an objective to optimize the first prediction of the key performance indicator in the first amount of future time; and
      a constraint being set to the second prediction in the second amount of future time, wherein the constraint is based on a parameter relating to a degradability of the key performance indicator.

2. The method of claim 1, further comprising, sending, by the processor, the optimized set point to the manufacturing apparatus.

3. The method of claim 1, further comprising:
   receiving, by a processor, new observed data from the manufacturing apparatus;
   generating, by the processor, new feature data based on the new observed data;
   updating, by the processor, the first model based on the new feature data;
   updating, by the processor, the second model based on the new feature data; and
   updating, by the processor, the optimized set point based on the objective and based on the constraint.

4. The method of claim 3, further comprising, prior to updating the optimized set point, comparing the first prediction related to the first model with a current value of the key performance indicator, wherein:
   in response to the comparison indicating an improvement in the key performance indicator, maintaining a current value of a current set point; and
   in response to the comparison indicating no improvement in the key performance indicator, updating the optimized set point.

5. The method of claim 1, wherein the observed data includes sensor data collected from at least one type of sensor.

6. The method of claim 1, wherein the at least one resolution includes temporal resolutions, such that the observed data includes sensor data collected from at least one time intervals.

7. The method of claim 1, wherein the constraint relates to a degradability of the second prediction of the key performance indicator.

8. The method of claim 1, wherein the second amount of future time is greater than the first amount of future time.

9. A system to determine an optimized set point for a manufacturing apparatus, the system comprising:
   a memory configured to store a set of instructions indicating an objective and a constraint;
   a processor configured to be in communication with the memory;

a machine learning module configured to be in communication with the processor;
an optimization module configured to be in communication with the processor and the machine learning module;
the processor being configured to:
  receive observed data from the manufacturing apparatus, wherein the observed data includes data collected by the manufacturing apparatus based on at least one resolution;
  generate feature data based on the observed data;
  send the feature data to the machine learning module;
the machine learning module being configured to:
  determine a first model using a portion of the feature data corresponding to a first amount of future time ranging from a start time to a first end time, wherein the first model relates to a first prediction of a key performance indicator of the manufacturing apparatus in the first amount of future time;
  determine a second model using another portion of the feature data corresponding to a second amount of future time ranging from the start time to a second end time different from the first end time, wherein the second model relates to a second prediction of the key performance indicator of the manufacturing apparatus in the second amount of future time;
  send the first model and the second model to the optimization module; and
the optimization module being configured to determine the optimized set point based on:
  an objective to optimize the first prediction of the key performance indicator in the first amount of future time; and
  a constraint being set to the second prediction in the second amount of future time, wherein the constraint is based on a parameter relating to a degradability of the key performance indicator.

10. The system of claim 9, wherein the processor, the memory, the machine learning module, and the optimization module are part of the manufacturing apparatus.

11. The system of claim 9, wherein the processor is further configured to:
  receive new observed data from the manufacturing apparatus;
  generate new feature data based on the new observed data;
  the machine learning module is further configured to:
    update the first model based on the new feature data;
    update the second model based on the new feature data; and
  the optimization module is further configured to update the optimized set point based on the objective and based on the constraint.

12. The system of claim 11, wherein the processor is further configured to, prior to the update of the optimized set point, compare the first prediction related to the first model with a current value of the key performance indicator, wherein:
  in response to the comparison indicating an improvement in the key performance indicator, maintain a current value of a current set point; and
  in response to the comparison indicating no improvement in the key performance indicator, instruct the optimization module to update the optimized set point.

13. The system of claim 10, wherein the at least one resolution includes temporal resolutions, such that the observed data includes sensor data collected from at least one time intervals.

14. The system of claim 10, wherein the constraint relates to a degradability of the second prediction of the key performance indicator.

15. The system of claim 10, wherein the second amount of future time is greater than the first amount of future time.

16. A computer program product for determining an optimized set point for a manufacturing apparatus, the computer program product comprising a computer readable storage medium having program instructions embodied therewith, the program instructions executable by a processing element of a device to cause the device to:
  receive observed data from the manufacturing apparatus, wherein the observed data includes data collected by the manufacturing apparatus based on at least one resolution;
  generate feature data based on the observed data;
  determine a first model using a portion of the feature data corresponding to a first amount of future time ranging from a start time to a first end time, wherein the first model relates to a first prediction of a key performance indicator of the manufacturing apparatus in the first amount of future time;
  determine a second model using another portion of the feature data corresponding to a second amount of future time ranging from the start time to a second end time different from the first end time, wherein the second model relates to a second prediction of the key performance indicator of the manufacturing apparatus in the second amount of future time; and
  determine the optimized set point based on:
    an objective to optimize the first prediction of the key performance indicator in the first amount of future time; and
    a constraint being set to the second prediction in the second amount of future time, wherein the constraint is based on a parameter relating to a degradability of the key performance indicator.

17. The computer program product of claim 16, wherein the program instructions are further executable by the processing element of a device to cause the device to:
  receive new observed data from the manufacturing apparatus;
  generate new feature data based on the new observed data;
  update the first model based on the new feature data;
  update the second model based on the new feature data; and
  update the optimized set point based on the objective and based on the constraint.

18. The computer program product of claim 16, wherein the program instructions are further executable by the processing element of a device to cause the device to, prior to updating the optimized set point, compare the first prediction related to the first model with a current value of the key performance indicator, wherein:
  in response to the comparison indicating an improvement in the key performance indicator, maintain a current value of a current set point; and
  in response to the comparison indicating no improvement in the key performance indicator, update the optimized set point.

19. The computer program product of claim 16, wherein the at least one resolution includes temporal resolutions, such that the observed data includes sensor data collected from at least one time intervals.

20. The computer program product of claim 16, wherein the second amount of future time is greater than the first amount of future time.

\* \* \* \* \*